United States Patent Office 3,126,401
Patented Mar. 24, 1964

3,126,401
IRON TRICARBONYL COMPLEXES OF 1,3-BUTADIENE CARBOXY COMPOUNDS
George G. Ecke, Penn Hills Township, Allegheny County, Pa., assignor to Ethyl Corporation, New York, N.Y., a corporation of Virginia
No Drawing. Filed Mar. 7, 1961, Ser. No. 93,845
17 Claims. (Cl. 260—439)

The present invention relates to organometallic compounds in which a transition metal is linked to a conjugated diene and to other electron donor groups. More particularly this invention relates to carboxy derivatives of butadiene iron sub-group tricarbonyl compounds and to methods for preparing them.

The presence of carboxy groups in the above type of compounds is of considerable interest because of the hydrophilic characteristics as well as reactivity of acid groups. However, the presence of such acid groups complicates the preparation of these compounds. These groups seem to be sufficiently reactive to cause extensive decomposition when an attempt is made to directly combine a conjugated dienoic acid with a metal carbonyl. This may in part be attributable to the electron-attracting effect of a carboxy group which may reduce the intensity of the electron field at the double bonds of the dienoic acid and thereby diminish the pi-bonding ability of the double bonds. Such an explanation would also account for the failure of pi-bond formation when an esterified form of the dienoic acid is used in place of the unesterified form.

Among the objects of the present invention is the provision of novel organometallic diene compounds containing carboxy and carbonyl groups.

Additional objects of the present invention include methods for preparing such compounds.

The above as well as further objects of the present invention will be more completely understood from the following description of several of its exemplifications.

It has been discovered that pentacarbonyls of iron sub-group metals (iron, ruthenium and osmium) will undergo pi-bonding with a butadiene-1,3 that has at least one carboxy substituent with up to 6 carbon atoms when this group is esterified with a lower alkanol, such as methanol and ethanol. Furthermore the dienoic ester compounds thus formed can then be hydrolyzed to form the corresponding dienoic acid compounds which readily dissolve in aqueous alkaline solutions. These acids are relatively strong and form salts of bases that are quite weak such as alkylamines, in addition to salts of the stronger bases such as sodium hydroxide, aluminum hydroxide and the like.

Any of the above compounds can be used to supply the metal atoms they contain in soluble organometallic form. Such organometallic addition to fuels like diesel fuel, domestic heating oil, jet fuel, gasoline and wax, are known to improve the combustion and the compounds of the present invention are also suitable for this purpose. The pi-bonded esters produced in accordance with the present invention are also suitable for the application of metal coatings by thermal decomposition, as described in U.S. Patent 2,898,235 granted August 4, 1959.

The pi-bonding of the present invention takes place fairly readily by merely heating a mixture of the reactants to between about 90 and 190° C. Somewhat lower temperatures can be used but the reaction then takes place at an impractically low rate. Higher temperatures cause fairly rapid decomposition and are undesirable for this reason. Agitation can be used if desired, and the reaction may be conducted in an inert atmosphere or in air if desired. In general, any nonreactive solvent such as alkanes, alkyl ethers and diethers, can be used although no solvent is necessary even where the organo reactant does not dissolve in the pentacarbonyl reactant.

The following examples illustrate but do not limit the invention:

EXAMPLE I

Ethyl Sorbate Iron Tricarbonyl

A mixture of 100 g. (0.7 mole) of ethyl sorbate and 69 g. (0.35 mole) of iron pentacarbonyl was refluxed 21 hours in a flask having a gas take-off connection leading to a gas burette. The reaction temperature was originally 100° C. but gradually rose to 141° C. During this period 0.4 cubic foot of gas was evolved, amounting to 66% of the amount theoretically liberated by the loss of two carbonyl groups from the five in the pentacarbonyl. The resulting mixture was then fractionated using a ten-plate helix-packed column. Unreacted iron carbonyl distilled over at 27° C. (31 mm.), ethyl sorbate distilled over at 62° C. (3 mm.), and the product came over between 90–110° C. (2 mm.). The product was collected as a red oil which crystallized on standing and was then recrystallized from iso-octane, yielding 39 g. (40%) of pure ethyl sorbate iron tricarbonyl crystals, red in color and melting at 66–67° C. The infrared spectrum of the material showed carbon-hydrogen stretching at 3.3–3.4 mu and metallocarbonyl bands at 4.9 and 5.05 mu.

A sample was subjected to elemental analysis with the following results:
Found: C—47.9%, H—4.60%, Fe—19.9%.
Calculated for $C_{11}H_{12}FeO_5$: C—47.2%, H—4.28%, Fe—20.0%.

EXAMPLE II

Ethyl Sorbate Ruthenium Tricarbonyl

The process of Example I is carried out except with ruthenium pentacarbonyl used instead of iron pentacarbonyl, and ethyl sorbate ruthenium tricarbonyl is produced.

EXAMPLE III

Sorbic Acid Iron Tricarbonyl

A mixture of 0.018 mole of ethyl sorbate iron tricarbonyl prepared by Example I and 0.02 mole of sodium hydroxide in 15.7 ml. methanol was refluxed 1.3 hours. After cooling, the solvent was distilled off in vacuo and the remaining brown salt dissolved in 25 ml. water. This water solution was extracted with an equal quantity of diethyl ether and the extract phase discarded. To the remaining aqueous phase 0.018 mole of hydrochloric acid was added and caused a yellow precipitate to be formed. Filtering the precipitate away from the solution gave a product which after recrystallizing from benzene, showed a 50% yield of yellow needles, M.P. 198–199 (decomp.). An analysis of the needles for iron content revealed 22.1%, the theoretical value for $C_9H_8FeO_5$ being 22.2%.

EXAMPLE IV

Diethyl Muconate Iron Tricarbonyl

A mixture of 9.8 g. (0.05 mole) of iron pentacarbonyl, 9.9 g. (0.05 mole) of diethyl muconate (trans, trans), and 15 ml. decalin was refluxed (129–173° C.) for 7.5 hours, during which time 0.086 cubic foot of gas (100% of the theoretical amount) was evolved. The resulting slurry was made less viscous by dilution with 25 ml. benzene, filtered, and the filtrate subjected to evacuation to distill off the benzene. A Claisen distillation at 2 mm. was carried out on the residual oil. A colorless oil (decalin) distilled over between 27–38° C. The desired product distilled over between 119–139° C. as a red oil which crystallized on standing. Recrystallization from iso-octane yielded 8.9 g. (53%) of diethyl muconate iron tricarbonyl as red crystals melting at 63–65° C. An infrared spectrum of a sample showed carbon-hydrogen stretching at 3.3 mu and metallocarbonyl bands at 4.8 and 5.0 mu. An analysis for iron content was identical with the theoretical value of 16.6%.

EXAMPLE V

Diethyl Muconate Osmium Tricarbonyl

The process of Example IV is carried out except that osmium pentacarbonyl is used instead of the iron pentacarbonyl, and diethyl muconate osmium tricarbonyl is produced in very good yield.

EXAMPLE VI

Muconic Acid Iron Tricarbonyl

A mixture of 3.5 g. (0.01 mole) of diethyl muconate iron tricarbonyl prepared by Example IV, and 0.03 mole of potassium hydroxide in 20 ml. methanol is refluxed for 3 hours. Upon cooling, the solvent is distilled off in vacuo and the remaining salt is dissolved in 30 ml. water. This salt is extracted with diethyl ether, precipitated and recrystallized as in Example III to give an excellent yield of muconic acid iron tricarbonyl (trans, trans).

The pi-bonded compounds of the present invention are quite stable. They do not decompose rapidly even at temperatures as high as 100° C. or under the effects of ultraviolet light, intense evacuation, or strong alkali or oxidizing agents. For instance 6 hours or refluxing of ethyl sorbate iron tricarbonyl with ethanolic KOH showed only a slight loss of material, the hydrolyzed product being recovered in excellent yield. During such heating an amount of gas is given off corresponding to about 2% of the carbonyl content of the tricarbonyl compound.

The esters formed in accordance with the present invention lend themselves to ready transesterification, however. Other alkyl esters and mixed esters are readily formed in this way, as illustrated in the following:

EXAMPLE VII

Transesterification of Diethylmuconate Iron Tricarbonyl 1.4 g. (0.06 g.-atom) of sodium was dispersed in 10 cc. of toluene, the temperature of the dispersion was brought to reflux with stirring, and 5.1 g. (0.015 mole) of diethylmuconate iron tricarbonyl were added in one portion. A large excess of methanol (25 ml.) was then added with stirring, resulting in a slight heat kick. The resulting mixture was diluted with 50 ml. water and transferred to a separatory funnel. The aqueous layer was separated from the toluene layer and washed with two 30 ml. portions of toluene. The washings were combined with the toluene layer, and these combined materials washed with four 50 ml. portions of water, dried over sodium sulfate and filtered. Evaporation of the solvent in vacuo left a viscous oil which crystallized to a yellow-brown solid on standing. Recrystallization from hot ligroin (65–110° C.) yielded 3.4 g. (73%) of dimethylmuconate iron tricarbonyl M.P. 71–74° C., mixed melting point with starting material 46–68° C. The infrared spectrum of the product lacked the 7.3 microns C—CH$_3$ band present in the infrared spectrum of the starting material. Furthermore when treated with 3,5-dinitrobenzoyl chloride in pyridine the product decomposed to give trans-trans-dimethylmuconate melting at 155–157° C. (reported in the literature as 158° C. ). Saponification of the original reaction product with potassium hydroxide in ethylene glycol, produced a mixture from which methanol could be distilled off and identified as its 3,5-dinitrobenzoate melting at 103–105° C. and not depressed on admixture with an authentic sample of the methyl ester of 3,5-dinitrobenzoic acid.

Although as above indicated, the carboxy compounds of the present invention are quite stable at relatively lower temperatures, they rapidly lose stability as the temperature reaches about 200° C. This may be another effect of the electron-attracting influence of the carboxy group. Because of this more ready decomposition at elevated temperatures, the use of these compounds in fuels, as pointed out above, provides formation of decomposed metal particles somewhat earlier in the combustion cycle. This is particularly significant in the operation of engines such as spark ignition and diesel type engines, and it also makes for more rapid metal plating when these compounds are used as thermal coating materials as referred to above. The dicarboxy compounds both in free acid or partially or completely esterified forms, are particularly subject to thermal decomposition and accordingly show the above effect more strongly.

The compounds of the present invention are formed by reacting the above metal carbonyls with other carboxy alkyl butadienes including 1-carboxypropyl-butadiene-1,3; 2-carboxymethyl-butadiene-1,3; 1-acetoxymethyl-butadiene-1,3; 1-carboxyethyl-2-acetoxyethyl-butadiene-1,3; the methyl ester of decadiene-7,9-oic acid; and the di-isopropyl ester of tetradecadiene-7,9-di-oic-1,14 acid. After reacting to form the pi-bonded metallocarbonyls, these esters can be transesterified to provide other lower alkyl esters and can be hydrolyzed either partially or completely to convert all or some of the carboxy groups to free acid groups.

Obviously many modifications and variations of the present invention are possible in the light of the above teachings. It is, therefore, to be understood that within the scope of the appended claims the invention may be practiced otherwise than as specifically described.

What is claimed is:

1. Conjugated diene iron-subgroup metal tricarbonyl compounds wherein the conjugated diene is selected from the class consisting of
    (A) the 1,3-butadiene carboxy and dicarboxy acids and lower alkyl esters thereof; and
    (B) the alkyl substituted 1,3-butadiene carboxy and dicarboxy acids having up to 16 carbon atoms and the lower alkyl esters thereof.

2. A conjugated diene iron tricarbonyl compound wherein the conjugated diene is selected from the class consisting of
    (A) the 1,3-butadiene carboxy and dicarboxy acids and lower alkyl esters thereof; and
    (B) the alkyl substituted 1,3-butadiene carboxy and dicarboxy acids having up to 16 carbon atoms and the lower alkyl esters thereof.

3. Process for preparing the lower alkyl ester compounds of claim 1, said process comprising reacting an iron subgroup metal pentacarbonyl with a conjugated diene selected from the class consisting of
    (A) the lower alkyl esters of the 1,3-butadiene carboxy and dicarboxy acids; and
    (B) the lower alkyl esters of the alkyl substituted 1,3-butadiene carboxy and dicarboxy acids having up to 16 carbon atoms.

4. The process for preparing the lower alkyl ester compounds of claim 2, said process comprising reacting iron pentacarbonyl with a conjugated diene selected from the class consisting of
    (A) the lower alkyl esters of the 1,3-butadiene carboxy and dicarboxy acids; and
    (B) the lower alkyl esters of the alkyl substituted 1,3-butadiene carboxy and dicarboxy acids having up to 16 carbon atoms.

5. The process of claim 3 wherein the conjugated diene is a lower alkyl sorbate.

6. The process of claim 5 wherein the conjugated diene is ethyl sorbate.

7. The process of claim 3 wherein the conjugated diene is a di-lower alkyl muconate.

8. The process of claim 7 wherein the conjugated diene is diethyl muconate.

9. Process for preparing the carboxy and dicarboxy acid compounds of claim 1, said process comprising reacting an iron subgroup metal pentacarbonyl with a conjugated diene selected from the class consisting of
- (A) the lower alkyl esters of the 1,3-butadiene carboxy and dicarboxy acids; and
- (B) the lower alkyl esters of substituted 1,3-butadiene carboxy and dicarboxy acids having up to 16 carbon atoms, and subsequently hydrolyzing the conjugated diene ester compound thereby produced.

10. The process for preparing the carboxy and dicarboxy acid compounds of claim 2, said process comprising reacting iron pentacarbonyl with a conjugated diene selected from the class consisting of
- (A) the lower alkyl esters of the 1,3-butadiene carboxy and dicarboxy acids; and
- (B) the lower alkyl esters of the alkyl substituted 1,3-butadiene carboxy and dicarboxy acids having up to 16 carbon atoms and subsequently hydrolyzing the conjugated diene ester compound thereby produced.

11. Ethyl sorbate iron tricarbonyl.
12. Diethylmuconate iron tricarbonyl.
13. Dimethylmuconate iron tricarbonyl.
14. Lower alkyl sorbate iron tricarbonyl.
15. Sorbic acid iron tricarbonyl.
16. Lower alkyl muconate iron tricarbonyl.
17. Muconic acid iron tricarbonyl.

References Cited in the file of this patent

Greenfield et al.: J. Organic Chem., Volume 21 (1956), pages 875–878.